United States Patent
Hsu et al.

(10) Patent No.: US 7,382,951 B2
(45) Date of Patent: Jun. 3, 2008

(54) METHOD FOR SEQUENTIALLY WRITING FIBER BRAGG GRATING BY USING REAL-TIME SIDE-DIFFRACTION OPTICAL FIBER POSITION MONITORING

(75) Inventors: Kuei-Chu Hsu, Yongkang (TW);
Lih-Gen Sheu, Xinwu Shiang (TW);
Kai-Ping Chuang, Pingtung (TW);
Shu-Hui Chang, Gangshan (TW);
Yinchieh Lai, Taichung (TW)

(73) Assignee: National Chiao Tung University, Hsinchu (TW)

( * ) Notice: Subject to any disclaimer, the term of this patent is extended or adjusted under 35 U.S.C. 154(b) by 237 days.

(21) Appl. No.: 11/225,670

(22) Filed: Sep. 12, 2005

(65) Prior Publication Data

US 2006/0263007 A1   Nov. 23, 2006

(30) Foreign Application Priority Data

May 17, 2005   (TW) ............... 94115916 A

(51) Int. Cl.
*G02B 6/00*   (2006.01)
*G02B 6/34*   (2006.01)
(52) U.S. Cl. ....................................... 385/37
(58) Field of Classification Search ............ 385/37
See application file for complete search history.

(56) References Cited

U.S. PATENT DOCUMENTS

| | | | |
|---|---|---|---|
| 5,830,622 A | 11/1998 | Canning et al. | |
| 5,945,261 A | 8/1999 | Rourke | |
| 6,753,118 B2 | 6/2004 | Deshmukh et al. | |
| 6,801,689 B1 | 10/2004 | Sweetser et al. | |
| 6,813,079 B2 | 11/2004 | Laming et al. | |
| 6,834,977 B2 | 12/2004 | Suehiro et al. | |

FOREIGN PATENT DOCUMENTS

TW   434431   5/2001

OTHER PUBLICATIONS

K.P. Chuang et al. ("Interferometric side-diffraction position monitoring techique for writing long fiber Bragg gratings", Conference on Lasers and Electro-Optics 2004, (May 16, 2004), CThM6.*
Kuei-Chu Hsu et al. ("Improved Fiber Bragg Grating Step-Scan Exposure by Interferometric Side-Diffraction Position Monitoring Technique with Reference Fiber Grating", 2004, Proc. Of OPT, B-SU-VIII10-3).*

(Continued)

*Primary Examiner*—M. R. Connelly-Cushwa
(74) *Attorney, Agent, or Firm*—Bucknam and Archer

(57) ABSTRACT

The present invention provides a fiber Bragg Grating sequential writing method with real-time optical fiber position monitoring, characterized in that the relative phase between a fiber grating and a writing interference beam at each positioning point is determined by an interferometric side-diffraction method, and writing is sequentially performed. Accuracy in fabricating a long and complex fiber grating structure can be increased by decreasing or avoiding accumulative errors caused by long-term scan of monitoring optical fiber position, or by a means for fabricating a wanted reference fiber Bragg grating with similar settings.

7 Claims, 2 Drawing Sheets

OTHER PUBLICATIONS

M.J. Coke, et al., *"Moving Fibre/Phase Mask-Scanning Beam Technique for Enhanced Flexibility in Producing Fibre Gratings with Uniform Phase Mask,"* (Aug. 1995), Electronics Letters, vol. 31, No. 17, pp. 1488-1490.

A. Asseh, et al., *"A Writing Technique for Long Fiber Bragg Gratings with Complex Reflectivity Profiles,"* (Aug. 1997), Journal of Lightwave Technology, vol. 15, No. 8, pp. 1419-1423.

I. Petermann, et al., *"Fabrication of Advanced Fiber Bragg Gratings by Use of Sequential Writing with a Continuous-Wave Ultraviolet Laser Source,"* (Feb. 2002), Applied Optics, vol. 41, No. 6, pp. 1051-1056.

Kuei-Chu Hsu, et al., *"Improved Fiber Bragg Grating Step-Scan Exposure by Interferometric Side-Diffraction Position Monitoring Technique with Reference Fiber Grating,"* (2004), Proc. of OPT, B-SU-VIII10-3.

K.P. Chuang, et al., *"Interferometric Side-Diffraction Position Monitoring Technique for writing Long Fiber Bragg Gratings,"* (2004), Proc. of CLEO-IQEC, CThM6.

Kuei-Chu Hsu, et al., *"Fiber Bragg Grating Sequential UV-Writing Method with Real-Time Interferometric Side-Diffraction Position Monitoring,"* (2005) Optics Express 13, pp. 3795-3801.

Kuei-Chu Hsu, et al., *"Fabrication of Fiber Bragg Gratings by Sequential UV-Writing with Real-Time Interferometic Side-Diffraction Position Monitoring,"* (2005) Proc. of ECOC, We4.P.132.

* cited by examiner

METHOD FOR SEQUENTIALLY WRITING FIBER BRAGG GRATING BY USING REAL-TIME SIDE-DIFFRACTION OPTICAL FIBER POSITION MONITORING

BACKGROUND OF THE INVENTION

1. Field of the Invention

The present invention relates to a novel method for fabricating a fiber Bragg grating, which can increase the accuracy to fabricate a long and complex fiber grating structure. Especially, a fiber Bragg grating having a complex variance in refractive index and arbitrary phase shift is a very important optical communication element.

2. Description of the Related Art

Recently, several methods for fabricating a long and complex fiber grating structure, such as moving-fiber-scanning-beam method and sequential writing method, are continuously proposed. In these methods, a He-Ne laser interferometer is used to monitor the fiber position during the execution of UV-writing. However, the accumulative position reading errors due to the drift of the interference fringe of the interferometer and the inaccurate grating period estimation have caused significant influences on the fabrication of a long fiber Bragg grating (FBG) structure.

For example, Taiwanese Patent No. 434,431 discloses a method for writing arbitrary refractive index disturbances into a waveguide, which writes a movable waveguide directly by using beam and in a single-point way. The above-mentioned method varies refractive index along the waveguide simply by controlling the moving speed of the waveguide. However, the method is suitable only for a long-period fiber grating, not for a short-period fiber Bragg grating.

Furthermore, U.S. Pat. Nos. 6,834,977 and 6,813,079 disclose that a fiber grating is written into an optical fiber by sequential exposure to UV beam section by section through a phase mask, and an interferometer is used to monitor the position of each positioning point of a translation stage. However, the method for monitoring a written position of the optical fiber by using an interferometer causes the problem of the above-mentioned accumulative errors, and the period of a writing beam needs to be precisely calibrated in advance.

Moreover, U.S. Pat. No. 5,945,261 uses a principle in which luminescence is generated by exposing an optical fiber to UV beam. In the Patent, a small grating section is previously exposed, the intensity of the luminescence is detected for the use of feedback, and then a connected grating being long and having no discontinuous phases is formed. However, this method cannot have a phase shift arbitrarily inserted. U.S. Pat. Nos. 6,753,118 and 6,801,689 both have the same disadvantage caused by a method in which a grating is written by repeated exposures section by section with a feedback compensation, and a modified amount is calculated by a grating spectral response obtained after writing. However, this method is not easy to be monitored in time, and is suitable for grating modification after writing. U.S. Pat. No. 5,830,622 discloses that UV beam is additionally exposed to a specific position so as to adjust refractive index, leading to an additional phase shift. However, a second scan is needed, more time is taken, and a wanted phase shift cannot be easily obtained section by section.

M. J. Coke, et al. issues a paper entitled "Moving Fiber/Phase Mask-Scanning Beam Technique for Enhanced Flexibility in Producing Fiber Gratings with Uniform Phase Mask," Electronics Letters, Vol.31, No. 17, 1488 (1995) 1490, in which a grating is written into an optical fiber by moving the optical fiber or a phase mask. However, the length of a fiber grating fabricated by this method is limited to the length of the phase mask, and thus, the sharpness of a written pattern is affected by the limitation of moving speed.

Adel Asseh, Heleg Storoy, et al. issues a paper entitled "Writing Technique for Long Fiber Bragg Grating with Complex Reflectivity Profile," Journal of Lightwave Technology, Vol. 15, No. 8, 1419 (1997) 1423, in which a grating is written by repeated exposures section by section, and an interferometer is used to monitor the position of each positioning point of a translation stage. However, the writing beam is a pulse UV-light laser, and can introduce the problem of extra noise.

Ingemar Petermann et al. issues a paper entitled "Fabrication of Advanced Fiber Bragg Gratings by Use of Sequential Writing with a Continuous-Wave Ultraviolet Laser Source," Applied Optics, Vol. 41, No. 6, 1051 (2002) 1056, in which a grating is written by repeated exposures section by section, and an interferometer is used to monitor the position of each positioning point of a translation stage. Although the writing beam is a continuous UV beam, the method of monitoring the written position of an optical fiber by using an interferometer can cause the problem of accumulative errors, and the period of a writing beam needs to be precisely calibrated in advance.

SUMMARY OF THE INVENTION

The present invention provides a fiber Bragg Grating sequential writing method with real-time optical fiber position monitoring, characterized in that the relative phase between a fiber grating and a writing interference beam at each positioning point is determined by an interferometric side-diffraction method, and writing is sequentially performed. Accuracy in fabricating a long and complex fiber grating structure, especially a fiber Bragg grating having a complex variance in refractive index and arbitrary phase shift, can be increased by decreasing or avoiding accumulative errors caused by long-term scan of monitoring optical fiber position, or by a means for fabricating a wanted reference fiber Bragg grating with similar settings. Meanwhile, the present invention proposes the structures of real-time optical fiber position monitoring of two similar devices. The first structure is only used to fabricate a fiber Bragg grating having a single-period uniform refractive index distribution. The second structure can be used to fabricate a fiber Bragg grating having arbitrary refractive index distribution and arbitrary phase shift.

An object of the present invention is to provide a method for fabricating a fiber Bragg grating having a single-period uniform refractive index distribution, characterized by probing an exposed grating section as a phase reference for next grating section writing. The method comprises the following steps:

(1) probing a just-exposed fiber grating section;

(2) focusing a probe beam on the just-exposed fiber grating section, and generating a first-order Bragg diffraction if the phase satisfies Bragg's condition;

(3) generating an interference pattern of the diffraction probe beam and the other probe beam by using a beam combiner, and recording the interference pattern by using a CCD camera;

(4) generating a periodic UV intensity pattern by dividing a laser UV beam into two beams having the same intensity and causing an interference between the two beams, and writing the periodic UV intensity pattern into a waiting for being exposed optical fiber to form a single fiber Bragg grating section;

(5) shifting a translation stage which holds the waiting for being exposed optical fiber by a given distance, and then, fine tuning a piezoelectric translator (PZT) stage according to an measurement result of grating phase of the just-exposed grating section; and (6) repeating the above steps to sequentially connect and form a long fiber Bragg grating.

The probe beam of Step (2) is obtained by expanding He-Ne laser beam into abeam having a diameter of 3 mm by two spherical lenses (SL), and then allowing the expanded beam to pass through a polarizing beam splitter and to be divided into a probe beam A and the other probe beam B; the optimized interference pattern of Step (3) is obtained by adjusting two half-wave plates, and the diffraction probe beam and the other probe beam is combined by a beam combiner, the intensity ratio of the two beams are controlled by the first half-wave plate, and the polarization direction of the probe beam B is rotated with respect to the probe beam A by the second half-wave plate; the wavelength of the laser UV beam of Step (4) is preferably 244 nm, furthermore, A half-wave plate is placed in one path of the two interference beams, and a pure apodization (flat DC-index modulation) of the final fiber Bragg grating can be obtained; in Step (5), a frequency-doubled argon-ion laser emits a CW 244-nm single polarization UV beam into a two-beam interferometer to form a UV beam having a periodic intensity distribution in a full width at half maximum (FWHM) of 6.5 mm, the formed UV beam is written into an optical fiber to form a fiber Bragg grating section, and many strongly-overlapped, equally-spaced, and Gaussian-shaped fiber Bragg grating sections are connected to obtain a long fiber Bragg grating having an accurate grating phase alignment; in Step (6), the final fiber Bragg grating is produced after 80-section sequential writing to reach a total grating length of about 80 mm, and the fiber scan step is about 1 mm to make the total grating length more than 80 mm.

In practice, the whole algorithm is implemented with LabVIEW software for automatically controlling the whole exposure process.

The above-stated side-diffraction position monitoring method that probes a just-exposed grating section has been employed for preparing a single-period fiber grating with a strong index-modulation. A real-time side-diffraction position monitoring method is used to develop a way of manufacturing this single-period fiber grating having a strong index-modulation. It facilitates to be used for a wanted reference fiber grating stated in another object of the present invention.

A further object of the present invention is to obtain a real-time side-diffraction position monitoring by probing a reference grating, characterized by probing another reference grating as a phase reference for each section writing. A reference grating required in this device can be manufactured from the previous step or by a writing method using a phase mask. The real-time side-diffraction position monitoring method of the present invention comprises the following steps: (1) arranging a reference fiber Bragg grating and a waiting to be exposed optical fiber in parallel, the modified amount of refractive index of the reference fiber Bragg grating is large and uniform;

(2) allowing a probe beam to be incident along the Bragg angle of the reference grating to form a first-order Bragg diffraction beam when the positioning point of each UV beam overlap exposures is determined, and generating an interference fringe by causing an interference between the first-order Bragg diffraction beam and another reference beam;

(3) after a translation stage is shifted by a predetermined distance to around next positioning point, fine tuning the translation stage to the final position of this positioning point by comparing the phase distributions of interference fringes before and after shifting the translation stage by using a feedback system until phase distribution falls within a given error range;

(4) turning on a UV beam exposure shutter for a given exposure time and then turning off the shutter; and (5) shifting the translation stage to next positioning point, and repeating steps (3) and (4).

The reference fiber Bragg grating of step (1) is used to complete a connected grating section by section by shielding the continuous UV beam laser, not by repeating exposures section by section to write a grating and using an interferometer to monitor the position of each positioning point of the translation stage. Therefore, it is unnecessary to use a pulse UV beam as a writing beam, no extra noise is introduced, and no problem of accumulative errors is caused; Furthermore, step (3) uses a feedback system to detect the phase distribution of the reference fiber Bragg grating at each positioning point, so that phase connection of each written grating section is continuous. Therefore, a fiber Bragg grating being long and not phase discontinuous is fabricated; and when a fiber Bragg grating having complex refractive index distribution and phase shift, a very simple way is provided to perform a UV beam writing action. As compared to methods disclosed in the prior art or known scientific or technical literatures, in which accumulative position errors are easily introduced or a second exposure must be further performed to compensate already existing phase errors, it has obvious progress and break through.

Thereafter, a last object of the present invention relates to a method of fabricating a reference grating, characterized by probing a just-exposed grating section as a phase reference for next section writing by a method similar to the method of fabricating a fiber Bragg grating having a single-period uniform refractive index distribution according to the present invention, wherein a PZT stage is fine tuned until the phase distribution of the just-exposed fiber grating in this step is the same as the phase distribution of the previous step.

DESCRIPTION OF THE PREFERRED EMBODIMENTS

The technical content and implementation means of the present invention is described with reference to the following embodiments.

First Embodiment

Figures 1A, 1B:
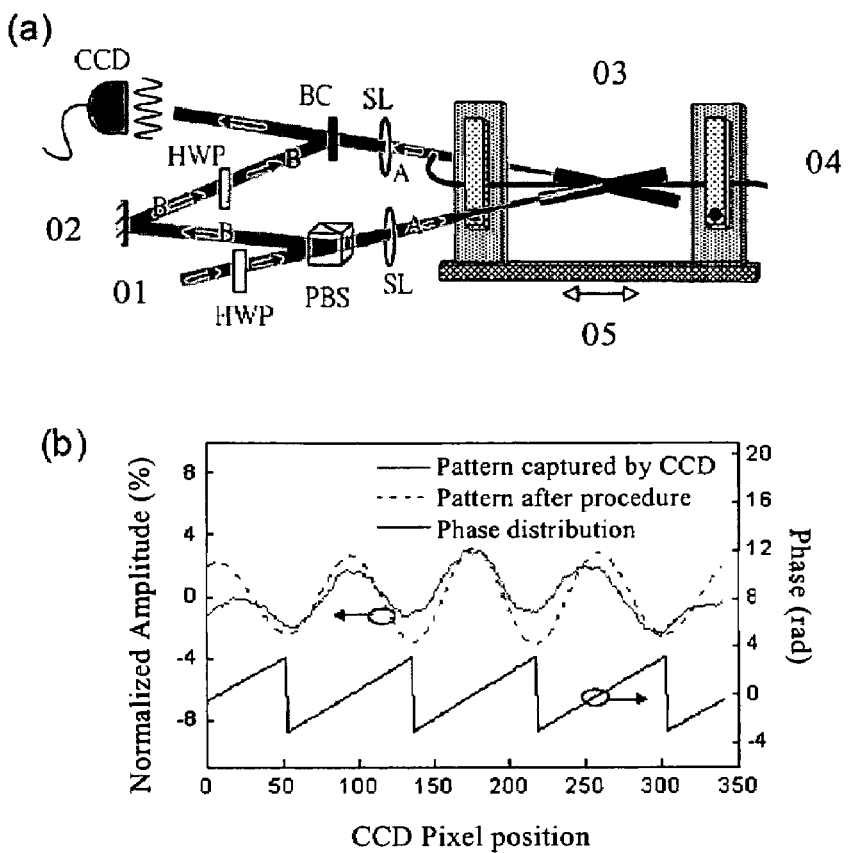
FIG. 1(a) shows a structural diagram of real-time side-diffraction position monitoring by probing a just-exposed section.
FIG. 1(b) shows the typically resulted periodic pattern captured by the CCD camera and the obtained phase distribution according to the implementation of FIG. (a).

Real-Time Side-Diffraction Position Monitoring by Probing a Just-Exposed Section In the first embodiment, the real-time side-diffraction position monitoring is performed by probing a just-exposed fiber grating section. FIG. 1(a) shows a schematic diagram of the first embodiment. First, a 5-mW single-polarization He—Ne laser beam (01) is expanded with two spherical lenses (SL) to achieve a final beam diameter of roughly 3 mm. It is then divided into two probe beams A and B with a polarization beam splitter. The function of the first half-wave plate (HWP) is to control the intensity ratio of these two divided beams. The second half-wave plate rotates the polarization direction of the probe beam B relative to the probe beam A. Next, the probe beam A is focused onto the exposed optical fiber (04) with a spherical lens (SL) of 20-cm focal length. The first-order Bragg diffraction of the probe beam A is generated under the phase-matching Bragg condition $\sin\theta_1 = Nb \times \lambda/\lambda_B$, wherein θ1 is the input angle of the probe beam in air, Nb is the effective refractive index of the exposed fiber (04) at the Bragg wavelength $\lambda_B$, and λ is the wavelength of the probe beam. Diffracted probe beams A and B are combined at beam combiner with an interference angle of $\theta_2$. A 440×480 monochrome CCD camera with a pixel width of 7.15-μm is utilized to record the interference pattern produced by the probe beams A and B. The visibility of the interference pattern can be optimized by adjusting the two half-wave plates. A frequency-doubled argon-ion laser launches a CW 244-nm single-polarization ultra-violet (UV) beam into a two-beam interferometer. Exposure of the interference UV beams with the FWHM of 6.5 mm forms a periodic UV intensity pattern onto the exposed fiber to include a single fiber Bragg grating (FBG) section. The long fiber Bragg grating is achieved by connecting many strongly-overlapped, equally-spaced, Gaussian-shaped fiber Bragg grating sections with accurate grating phase alignment. A half-wave plate is placed in one path of the two interfering beams to obtain pure apodization (flat DC-index modulation) for the final fiber Bragg grating. The translation stage (05) comprises a linear motor stage and a piezoelectric translator (PZT) stage with sub-nm position resolution. The accurate alignment of the fiber position is achieved by shifting the translation stage by a given distance and then iteratively fine-tuning the PZT stage (05) according to the grating phase measurement of the just-exposed grating section.

The intensity of the first-order diffracted probe beam A is denoted as $I_A$, and the intensity of the probe beam B is assumed to be $I_B$. The intensity distribution of the interference fringe on the CCD along the x-axis, which is perpendicular to the bisector of the two interfering beams, is given by:

$$I_{int} = I_A + I_B + 2\sqrt{I_A I_B} \cdot \cos\left[kx \cdot 2\sin\left(\frac{\theta_2}{2}\right) + \delta\right] \quad \text{Equation (1)}$$

where $k=2\pi/\lambda$ is the wave vector, $\theta_2$ is the interfering angle and δ is the phase difference between the two interfering beams. The interference pattern $I_{int}$ is processed by the Fourier transform to obtain the corresponding spatial frequency spectrum. The spectrum is then filtered to keep only the positive frequency part and is inverse-Fourier-transformed back to the original domain. The phase δ of the probed fiber grating location can then be identified by taking the arg of the processed data. FIG. 1(b) shows the typically resulted periodic pattern captured by the CCD camera and the obtained phase distribution. For producing single period fiber Bragg gratings, the PZT stage is fine tuned until the just-exposed fiber grating phase distribution obtained in this step is the same as that of last step. The UV-beam shutter is then turned on for writing the present fiber Bragg grating second with a given time duration. In practice, the whole algorithm is implemented with the LabVIEW software for automatically controlling the whole exposure process.

Figure 2:
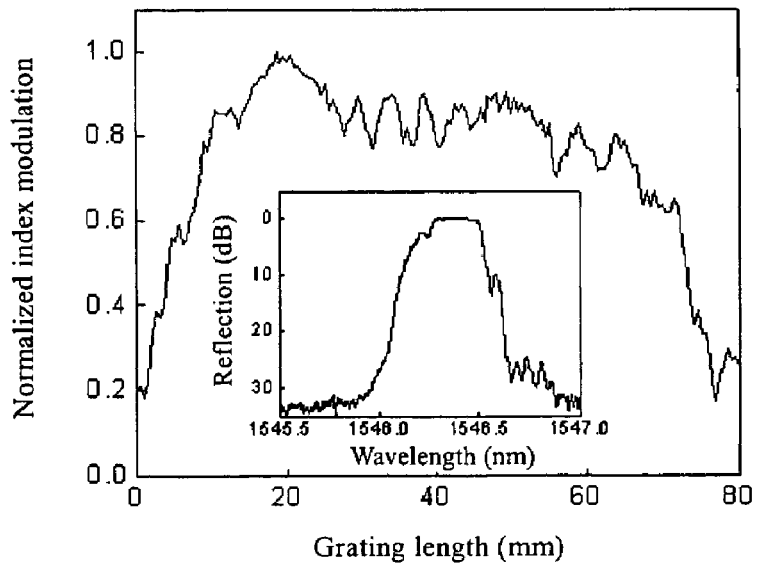
FIG. 2 shows a refractive index profile and the Bragg wavelength of a uniform fiber grating according to the implementation of the structure.

As an example, this side diffraction position monitoring method that probes the just-exposed section has been employed for preparing a single-period fiber grating with strong index-modulation. The fiber used is the photosensitive fiber (Fibercore PS15800) after 1,900-par hydrogen loading at room temperature for several days. The FWHM of the UV beam is about 6.5 mm and the fiber scan step is about 1 mm. The final fiber Bragg grating is produced after an 80-section sequential writing to reach a total grating length of about 80 mm. The same side-diffraction method is applied to measure the whole refractive index modulation profile of the fabricated fiber grating along its fiber axial direction. FIG. 2 shows the measured result. One can see from FIG. 2 that the fabricated fiber grating profile is substantially uniform. The optical reflection spectrum in the inset of FIG. 2 shows that the Bragg wavelength is 1.546 μm and there should be no obvious phase errors. Such a fiber Bragg grating will be used as the reference grating for the embodiment in next section.

Second Embodiment

Figures 3A, 3B:
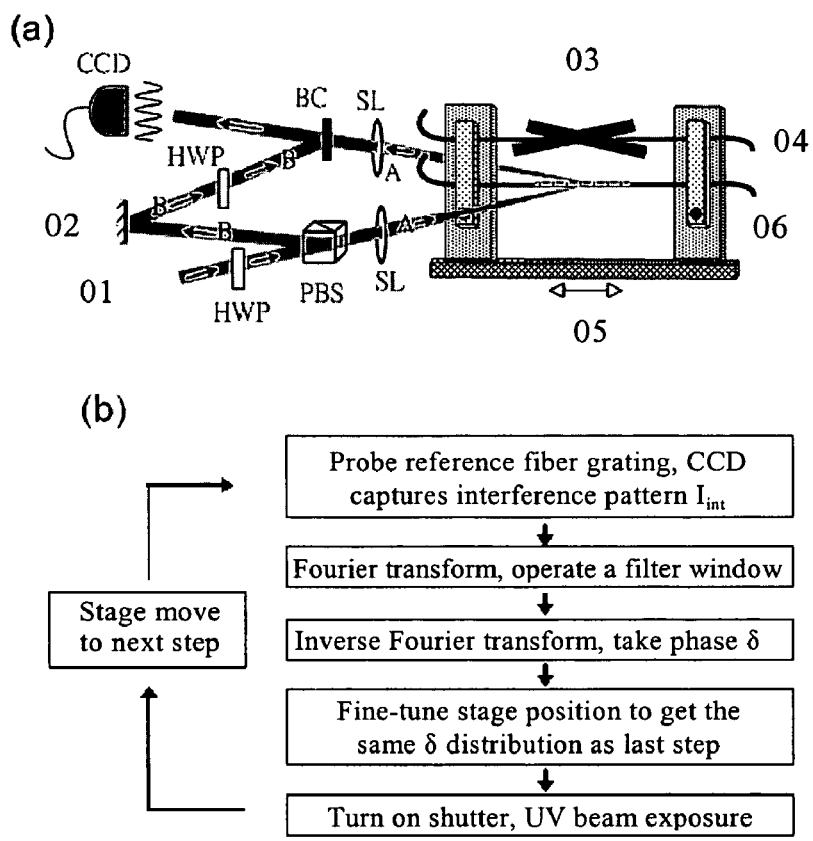
FIG. 3(a) shows a structural diagram of real-time side-diffraction position monitoring by probing a reference grating.
FIG. 3(b) reveals a flow chart of the implementation of FIG. 3(a).

Real-Time Side-Diffraction Position Monitoring by Probing a Reference Grating In the second embodiment, the experimental setup includes a reference fiber grating and an exposure fiber which are clamped in parallel on the same translation stage (05). FIG. 3(a) depicts the schematic diagram of the system. The reference grating with a strong and uniform refractive index modulation is prepared in advance with the first embodiment. The reference fiber grating under probe is adequately uniform and has a sinusoidal index modulation profile n(x) along its fiber axial direction as:

$$n(x) = n_0 + \Delta n \cdot \cos\left(\frac{2\pi x}{\Lambda} + \phi(x)\right) \quad \text{Equation (2)}$$

where no is the average refractive index, Δn is the amplitude of refractive index modulation, Λ is the grating period, and φ(x) describes spatial grating phase. The UVgenerated interference period is fine tuned to match the reference fiber grating period, even though this restriction can be relaxed since it will only cause a center-wavelength shift. The accurate alignment of the fiber position is achieved by shifting the translation stage by a given distance and then iteratively fine-tuning the PZT stage according to the reference grating phase measurement.

The UV-beam shutter is then turned on for writing the present fiber Bragg grating section with a given time duration. FIG. 3(b) reveals a flowchart of the whole operation algorithm. In practice, the main advantage of this method is that long fiber Bragg gratings can be fabricated even when the index-modulation is small and with the option for easy insertion of arbitrary shifts.

Figures 4A, 4B:
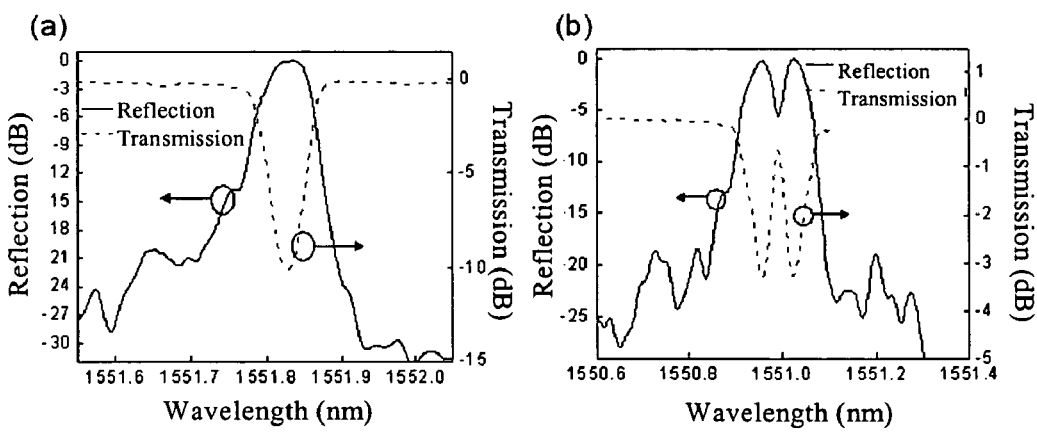
FIG. 4(a) shows the reflection and the transmission spectra of a 70-mm-long, 0.07-nm Gaussian apodized fiber Bragg grating for real-time side-diffraction position monitoring by probing a reference grating.
FIG. 4(b) shows the reflection and the transmission spectra of a 40-mm-long, single π-phase-shifted Gaussian apodized fiber Bragg grating for real-time side-diffraction position monitoring by probing a reference grating.

As to real-time side-diffraction position monitoring by probing a reference grating, we have verified the feasibility of the proposed method by two examples. The first example is to fabricate a narrowband, Gaussian apodized fiber Bragg grating with a constant DC refractive index modulation along the whole grating. The reference grating with uniform and strong refractive index modulation is probed to identify the related grating phase information. The FWHM of the UV beam is about 6.5 mm and the fiber scan step is about 1.2 mm. The final fiber Bragg grating is produced after a 58-section sequential writing to reach a total grating length about 70 mm. FIG. 4(a) shows the reflection and the transmission spectra of the exposed fiber Bragg grating. The reflection spectrum has a relatively flat top with the sidelobe level below −20 dB. The 3-dB bandwidth of the reflection spectrum is only 0.07 nm. The peak refractive index modulation is estimated to be $2.5 \times 10^{-5}$ for this 70-mm-long Gaussian apodized fiber Bragg grating, determined by simulation-fitting.

This example demonstrates the feasibility for fabricating long fiber Bragg gratings without noticeable phase errors, even when the written index modulation is below the threshold for reliable side-diffraction measurement.

The second example is to fabricate a 40-mm-long, single π-phase-shifted Gaussian apodized fiber Bragg grating with a constant DC refractive-index modulation. The scan step during the exposure is about 0.6 mm and the final fiber Bragg grating is achieved by connecting 70 fiber Bragg grating sections. A π phase shift is inserted into the center of the exposure fiber grating during the fabrication process. FIG. 4(b) shows the reflection and transmission spectrum of the exposure fiber. As expected, there is a narrow transmission peak within the stop-band due to the resonance caused by the π-phase-shift. This simple example demonstrates the feasibility of fabricating phase-shifted fiber Bragg gratings with the new scheme.

Although the invention has been disclosed in terms of preferred embodiment, the disclosure is not intended to limit the invention. Those skilled in the art can make changes and modifications within the scope and spirit of the invention which is determined by the claims below.

LIST OF MAJOR ELEMENTS AND THEIR CORRESPONDING REFERENCE NUMERALS

| | |
|---|---|
| 01 | probe beam (632.8 nm) |
| 02 | mirror |
| 03 | UV writing beam (244 nm) |
| 04 | waiting for being exposed optical fiber |
| 05 | translation stage |
| 06 | reference fiber grating |
| A | probe beam |

-continued

LIST OF MAJOR ELEMENTS AND THEIR CORRESPONDING REFERENCE NUMERALS

| | |
|---|---|
| B | probe beam |
| BC | beam combiner |
| HWP | half-wave plates |
| PBS | polarizing beam splitter |
| SL | spherical lenses |

What is claimed is:

1. A method for fabricating a complex fiber Bragg grating by using UV sequential writing, characterized by probing another reference grating as a phase reference for each grating section writing, comprising the steps of:
   (1) arranging a reference fiber Bragg grating and a waiting to be exposed optical fiber in parallel, the modulated amount of refractive index of the reference fiber Bragg grating is large and uniform;
   (2) allowing a probe beam to be incident along the Bragg angle of the reference grating to form a first-order Bragg diffraction beam when the positioning point of each UV beam overlap exposures is determined, and generating an interference fringe by causing an interference between the first-order Bragg diffraction beam and another reference beam;
   (3) after a translation stage (05) is shifted by a predetermined distance to around next positioning point, fine tuning the translation stage (05) to the final position of this positioning point by comparing the phase distributions of interference fringes before and after shifting the translation stage (05) by using a feedback system until phase distribution falls within a given error range;
   (4) turning on a UV beam exposure shutter for a given exposure time and then turning off the shutter; and
   (5) shifting the translation stage (05) to next positioning point, and repeating steps (3) and (4).

2. The method according to claim 1, wherein the optimized interference pattern of Step (3) is obtained by adjusting two half-wave plates, the intensity ratio of the two beams are controlled by the first half-wave plate, and the polarization direction of the probe beam B is rotated with respect to the probe beam A by the second half-wave plate.

3. The method according to claim 1, wherein step (3) uses the feedback system to detect the phase distribution of the reference fiber Bragg grating at each positioning point, so that phase connection of each written grating section is continuous.

4. The method according to claim 1, wherein the method can be used to fabricate a fiber Bragg grating having an arbitrary refractive index distribution and an arbitrary phase shift.

5. The method according to claim 1, wherein the waiting for being written optical fiber is a photosensitive fiber, and the writing light source is a UV beam.

6. The method according to claim 5, wherein the UV beam preferably has a wavelength of 244 nm.

7. A method for fabricating the reference grating of claim 1 through a method of fabricating a fiber Bragg grating having a single-period uniform refractive index distribution by using UV sequential writing, characterized by probing an exposed grating section as a phase reference for next grating section writing by:
   (1) shifting a translation stage (05) to around next positioning point by a predetermined distance, after an exposed fiber grating section is formed;

(2) allowing a probe beam to be incident along the Bragg angle of the exposed fiber grating section to form a first-order Bragg diffraction beam when the positioning point of next UV beam overlap exposures is determined, and generating an interference fringe by causing an interference between the first-order Bragg diffraction beam and another reference beam;

(3) fine tuning the translation stage (05) to the final position of this positioning point by comparing the phase distributions of interference fringes before and after shifting the translation stage (05) by using a feedback system until phase distribution falls within a given error range;

(4) turning on a UV beam exposure shutter for a given exposure time and then turning off the shutter; and (5) shifting the translation stage (05) to next positioning point, and repeating steps (3) and (4);

wherein a PZT stage is fine tuned until the phase distribution of the exposed fiber (04) grating in this step is the same as the phase distribution of the previous step.

* * * * *